United States Patent [19]
Helbling et al.

[11] Patent Number: 5,797,126
[45] Date of Patent: Aug. 18, 1998

[54] AUTOMATIC THEATER TICKET CONCIERGE

[76] Inventors: Edward Helbling, 47 Annandale Rd., Commack, N.Y. 11725; Andrew Glass, 26 Cedar Ridge La., Dix Hills, N.Y. 11746

[21] Appl. No.: 602,975

[22] Filed: Feb. 16, 1996

[51] Int. Cl.$^6$ .................................................. G06F 153/02
[52] U.S. Cl. ................................................................. 705/5
[58] Field of Search ................................ 705/5, 6, 26, 27, 705/15

[56] References Cited

U.S. PATENT DOCUMENTS

| | | | |
|---|---|---|---|
| 3,705,384 | 12/1972 | Walhberg | 705/5 |
| 5,237,499 | 8/1993 | Garback | 705/5 |
| 5,239,480 | 8/1993 | Huegel | 705/5 |
| 5,333,257 | 7/1994 | Merrill | |
| 5,475,585 | 12/1995 | Bush | 705/26 |
| 5,581,461 | 12/1996 | Coll et al. | 705/5 |

OTHER PUBLICATIONS

Cydee Miller, "Music marketers hoping to see a Net gain", Marketing News, Jan. 15, 1996, vol. 30, Issue 2, p. 2.
Larry Stevens, "Front-line systems", Computerworld, Mar. 2, 1992, vol. 26, Issue 9, pp. 61–63.

*Primary Examiner*—Donald E. McElheny, Jr.
*Attorney, Agent, or Firm*—Herbert Dubno

[57] ABSTRACT

A theater-ticket concierge system in which individual kiosks are in wireless communication with a central station so that, based upon programming from the central station, the individual events of interest can be selected by a patron who can view an excerpt or scene and, upon indicating interest, can then view available seating on a seating plan or the like. By selecting an available seat from the seating plan, the patron can be provided with a display of the stage or performance from that seat and, once seat selection is confirmed, the kiosk can, by communication with the central station, charge the patron's credit card and issue an information carrier in the form of a ticket to the event or a coupon which can be redeemed for such ticket.

17 Claims, 4 Drawing Sheets

AUTOMATIC THEATER TICKET CONCIERGE

FIELD OF THE INVENTION

The present invention relates to an automated theater ticket vending "concierge" or "kiosk" and event information and ticket sales system capable of providing related services superior to those of an experienced human concierge, and without the need for voice contact or person-to-person communication in any form, and, more particularly, to a method of correlating the purchase of tickets for reserved seating events to the quality of seating choices and the availability of said choices at any specific moment of desired purchase.

The invention, further, relates to an apparatus for that purpose comprising free-standing kiosks which can be remote from all represented theaters or event locations and remote from a central station correlating such sales to a continuously updated database of seating availability.

The invention also relates, in particular, to a method of and an apparatus for the sale or dispensing of tickets to particular events with reserved or assigned seating in connection with the display of segments of these productions or events, background information about the productions or events, display of actual stage or field views from seat locations prospectively selected for purchase, and display of theater or event location environs, exterior, interior, and points of architectural or historical interest amounting to a virtual theater tour accessed and controlled by a prospective ticket purchaser via an interactive human interface.

BACKGROUND OF THE INVENTION

In copending application Ser. Nos. 08/234,409 filed 28 Apr., 1994 and 08/215,372 filed 21 Mar., 1994 of Edward Helbling one of the present inventors, there have been described charitable contribution centralization systems in which, among other things, charitable collections can be made at kiosks which are remote from a central station and which can serve to issue information carriers representing a selected charity, a contribution made and other information such as, for example, a premium, award or reward to which the contributor or donor is entitled.

Key to the systems of the earlier applications are units which can be located at any selected situs to make the possibility of a charitable donation independent from any specific situs of the charity. Kiosks of that type can be provided in retail establishments, at financial institutions, shopping malls or other public places, and even at railroad stations, bus stops, parking lots and the like.

One of the draws for the use of such machines for making charitable contributions is the possibility that the donor can select some premium or reward which can be redeemed either at that location or at a ticket-sales or reward location which can be elsewhere than the situs of the kiosk. Vendors may contribute goods or services which are thus made available to charitable contributors and enable the vendor to engage in the public service as well.

In the system of Ser. No. 08/234,409, in particular, the central station could program the individual kiosks to indicate what premiums or rewards could be available for selection, the charities and/or vendors which are cooperating in the charitable program, etc.

The individual kiosks thus had displays, selector means for allowing selection of the charity to which a contribution was to be made, printer means or the like for issuing the information carrier, means for communication with the central station and, of course, means for collecting a payment.

There is also a need, in modern society, for access to events which require reserved seating and for that purpose centralized organizations have developed for event ticket sales, allowing the use of credit cards and even telephone ordering. Theater tickets can be obtained by telephone from such centralized operations, by providing a charge card number, advising the personnel of the event selected and even indicating the regions of the theater in which the seats should be located.

If those seats are available for that event, tickets may be set aside for the purchaser to be picked up at the box office.

While such telephone ticketing systems have greatly facilitated access to the theater, the degree of interaction allowed in this process is limited and the problems arising from the physical separation between the theater and the ultimate patron are not addressed. Furthermore, these systems are incapable of providing the security of immediate hard-copy confirmation of ticket purchases made.

Currently available ticket purchase systems, including even box office purchases in most aspects, do not allow a prospective purchaser to review, compare or otherwise make informed choices from among the many productions or events for which seats are available in any given time frame; nor can they provide information necessary to evaluate the suitability of specific theater environs, architecture, amenities, seating arrangements and access for the tastes, comfort and safety of an individual or group desiring to choose among many available venues for possible ticket purchases.

Furthermore, all current ticket purchase systems and means rely on the ticket purchaser's previous knowledge or already established interest in a particular production and/or production venue. Inasmuch as a free-standing, remote kiosk system can provide free access, without encumbent or implied pressure to purchase, to virtually all information required to review and select from among many available productions and venues, a system of this type can operate effectively independent from any advertising or publicity means or prior information including even word-of-mouth. This can be particularly important from the sale of tickets to productions in non-profit venues that currently suffer lack of attendance for lack of promotional funds and opportunities.

Indeed, the currently unaddressed physical separation between potential patrons and theaters, and the dearth of easily accessible information about available productions and production venues has limited the interaction between patrons and theaters, and, as a consequence, is a barrier which has limited the degree to which the public participates in modern theater productions.

In U.S. Pat. No. 4,974,252, for example, interactive commercial/entertainment systems are described which enable patrons in the theaters to communicate with persons at a broadcast center, thereby making events like attendance at the theater more interactive. In U.S. Pat. No. 3,427,438, a ticket-vending system is described in which sales of tickets can be charted on a seating layout. Indeed U.S. Pat. No. 5,333,257 even allows a view from a seat to be displayed. A ticket-issuing machine is described in U.S. Pat. No. 4,827,841, while U.S. Pat. No. 4,173,024 improves versatility in programming. These systems do not, however, make tickets to theater productions or other events more readily available, or provide information necessary to make informed choices from among many available productions and production venues.

OBJECTS OF THE INVENTION

It is, therefore, the principal object of the present invention to provide an improved system for sale of tickets to events, especially theater tickets and tickets to other events having reserved seating, whereby limitations and drawbacks of earlier systems can be eliminated or avoided.

Another object of this invention is to provide an improved method of correlating theater ticket purchases to the quality of seating choices and the availability of said choices at any specific moment of desired purchase which will more readily satisfy the purchasing public than earlier methods.

Another object of this invention is to provide an apparatus for sale of tickets which facilitates selection among events or productions, production venues and seating arrangements.

Another object of the invention is to create a system which stimulates greater public interest in live theater production and production venues by providing easy and widely available access to information much of which is currently available only through personal experience or prohibitively time consuming research with the goal of increasing the attendance of potential patrons at such productions.

Still another object of the invention is to make ticket selections and purchases possible without dependence on the availability of voice contact, without the implied pressure to purchase which is inherent in person-to-person communications, and with significantly reduced possibility of errors or misunderstandings which result from the intrinsic limitations of voice-only contact.

It is a specific object to provide a system which can satisfy increasing numbers of potential patrons who desire up-to-date and practically immediate access to ticket purchases based on spur of the moment availability of free time or previously unanticipated future free time, rather than on a planned social schedule or on desire to see a specific production in which interest was stimulated prior to the time of ticket purchase.

SUMMARY OF THE INVENTION

These objects and others which will become apparent hereinafter are attained, in accordance with the invention, by providing a multiplicity of ticket sales kiosks, each of which functions, relative to theater productions and other reserved seating events, as a "virtual concierge" and locating them at diverse sites remote from production or event locations and from a central station but providing each of these kiosks with means for displaying events so that an event can be selected, with means for displaying one or more scenes from the event so that a potential purchaser can be informed as to what that event offers, means for displaying seating possibilities and actual views from selected seating possibilities, thereby enabling the potential purchaser to appreciate the potential view of the live performance from the particular seat, means for payment by a selector and, of course, means for payment by a selector and, of course, means for generating an information carrier which may be the actual ticket or tickets or some indication that the purchaser is entitled to the ticket or tickets upon redemption of that information carrier at the box office or the like.

Unlike other systems which may use computer-aided illustration of seating plans, views of the stage from hypothetical seats or the like, the system of the invention assembles the displayed views of the seat and from the seat from live video which is coded, digitized and accessed by the program that allows the potential patron to wander virtually at will through the theater of interest, taking in all points of interest. These can include the area/street location, marquis, box office, lobby of a theater of interest, as well as the lounges, access to and egress from seating and amenities, and locations of historical or architectural points of interest. These are in addition to the stored video displays of the seating area, seating layout, stage and stage views from the particular seat. In the case of stadium venues, these views can include some of the views described above and playing field or court views from the particular seats.

The video displays can provide virtual access to places which are normally privileged, for example, the backstage, dressing rooms, locker rooms, training rooms, team offices or the like.

According to an important feature of the invention, the display screen of the kiosk will, in the absence of human intervention or selection of a specific item of patron interest have a continuous display of video representing segments of a performance or event, views of various production or event venues including theater marquis and interiors, theater districts, stadium views and views of artists or players so as to capture the attention of the casual viewer and in effect induce even the casual viewer to become a potential patron by enabling the viewer to involve himself or herself in a particular production by selection utilizing the touch screen or a button system. Note that we have referred to "buttons" to indicate a selection or command key operation, it will be understood that any selection or command can operate with touch screens or any other convenient selection information. Current path windows can be displayed so that they do not obscure access to other immediately associated windows. Video windows enlarge and start audio when touched, but automatically go back to path size when any particular sequence ends.

An important aspect of the invention is the fact that the kiosks are remote both from any particular production or event location and from the central station, and by and large are independent of one another, and yet enable the interactive relationship between the kiosk and the potential purchaser whereby scenes from the production or other event are displayed for the theater of a particular event and available and occupied seats for particular dates and times are provided on the display. The purchaser can then identify seats of interest and the display can show the seat in its relationship to other seats and a view on the stage or from such selected seats. The patron can then scan the seating plan and make quality comparisons among the various available seats.

When a specific seat purchase selection is indicated, and following authorization of the charge by the credit issuing company, communication with the central station and the production or event location back office confirms the instantaneous, real-time availability of the selected seat or seats, and updates central station and appropriate back office databases to insure that purchased seats are indeed reserved. The kiosk can then issue an information carrier or coupon entitling the bearer to the tickets for the selected seat or seats.

An important aspect of the kiosk system is its means for broadcasting or multi-casting updated seating availability and other production information that is subject to change to all kiosks whether or not connected by telephone line, cable or other hardwire means so that all kiosks provide identical and accurate access to the most current required information.

The kiosk system of the invention provides at one location multi-facility and multi-event selection capabilities and, through its central station, multi-facility, multi-event tracking and control of setting availability, reservation and confirmation. The information carrier that is generated can be a coded, serialized, counterfeit-resistant coupon that provides hard copy confirmation of a user's selection and that can be redeemed for actual tickets at the show or event facility box office or can be used directly as an admission coupon.

Another important feature of the virtual concierge of the invention is its ability to show digital full-motion video and true audio previews and excerpts of a multiplicity of productions or other events. These may be continuously displayed along with vignettes of location tours and other related displays in an "attract" mode. At any time an interested user can interrupt this sequence and use on-screen buttons to access a number of specialized features, each of which provides virtually instantly current information because of the communication between the central station and all kiosks.

To access these features the user simply touches a desired function or feature "button" which instantly accesses the listings. The user can then review information on as many listings as desired by touching the screen to highlight the desired listing item and then touching the button for desired information or audio/video display. The screen or button system provides page down and page up functions and function buttons with corresponding displays to guide the user to available features.

While the system can utilize the computerized illustration of U.S. Pat. No. 5,333,257, we prefer to utilize video views which have been assembled from live video, coded, digitized and accessed through the central station or from memory at the individual kiosk. Preferably the system will utilize feature buttons on the screen or on a button panel once the potential patron has been attracted to the kiosk by the displays in the "attract" mode.

Specifically, the method of the invention can comprise the steps of:

(a) communicating to a multiplicity of ticket-sales kiosks information as to events, times and seating availability at a plurality of performance locations;

(b) displaying information as to events at the ticket-sales kiosks;

(c) in response to selection of a particular event at one of the kiosks by a potential patron, displaying at least one scene exemplary of the particular event;

(d) displaying at the one of the kiosks for the particular event at the respective performance location a respective seating plan indicating available seats;

(e) in response to selection of a potentially available seat at the one of the kiosks by the potential patron, displaying a view representing a view from the selected potentially available seat;

(f) charging a credit card presented by the patron for a selected seat;

(g) issuing to the patron at the one of the kiosks an information carrier representing both a receipt for the charge made and a confirmation of the reserved seating selection, and which authorizes the bearer to issue of tickets at the box office or which can be used directly for admissions at the particular event; and (h) in response to investigation by a prospective purchaser through the use of on-screen function and feature buttons, and other interactive mean such as directional controllers, displaying a virtual tour with specific text, video and audio information relating to any particular production venue allowing such a purchaser to evaluate and compare available venues relative to access, egress, comfort, safety and other personal concerns and suitability issues not directly related to the production performance itself, and thereby further aiding in the selection process and facilitating purchase which can then be accomplished in the manner described above.

Preferably information as to events and times for which seating is available at a plurality of performance locations is communicated to the kiosks from a central station in communication with the production or event locations, and a display at the one of the kiosks for the particular event at the respective performance location of the respective seating plan indicating available seats is effected by dialog between the central station and the one of the kiosks.

The display of a view from a production location seat prospectively selected for purchase is preferably effected by accessing digitized video stored in various media formats and files in each of the one of the kiosks and therein maintained until such time as the production or event at the respective location is changed.

The issuing to the patron at the one of the kiosks of the information carrier representing a receipt for a charge made and a confirmed seat selection, authorizing admission of a bearer of the information carrier to the particular event is effected by dialog between the central station and the one of the kiosks.

Most advantageously, the selection is effected by the use of the touch-screen capabilities of the display.

The apparatus according to the invention can comprise:

a central station accumulating information as to events occurring at a multiplicity of performance locations, available seating at the events and times of the events;

a plurality of vending kiosks remote from the central station;

means for communicating to a multiplicity of the vending kiosks information as to events and times for which seating is available at a plurality of performance locations;

means at each of the vending kiosks for displaying information as to the events;

means operable in response to selection of a particular event at one of the kiosks by a potential patron, for displaying at least one scene exemplary of the particular event;

means at the one of the kiosks for displaying for the particular event at the respective performance location a respective seating plan indicating available seats;

means operable in response to selection and control of specific kiosk functions by a potential patron for displaying an interactive virtual theater tour providing detailed textual, audio and graphic information, and full-motion video relating to any particular production venue;

means in response to selection of a potentially available seat at the one of the kiosks by the potential patron, for displaying a view from the selected potentially available seat;

means at the one of the kiosks for charging a credit card presented by the patron for a selected seat; and means at the one of the kiosks for issuing to the patron at the one of the kiosks an information carrier representing a receipt for a charge made and a confirmed reserved seating selection, and either constituting an actual ticket or authorizing direct admission of a bearer upon presentation of the information carrier at the particular event location.

The communication link between each vending kiosk and the central station is preferably a wireless link but the communication link may, if desired, use a telephone wire or cable link.

Most advantageously, wireless communication is accomplished via Cellular Digital Packet Data (CDPD) transmission and reception.

The kiosk may also have standard Circuit Switched Cellular capability for the convenience of patrons who desire to contact other members of a potential theater-going party to notify or ask their opinion about a particular selection. In this case, service carrier charges would be added to the patron's previously authorized credit card.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
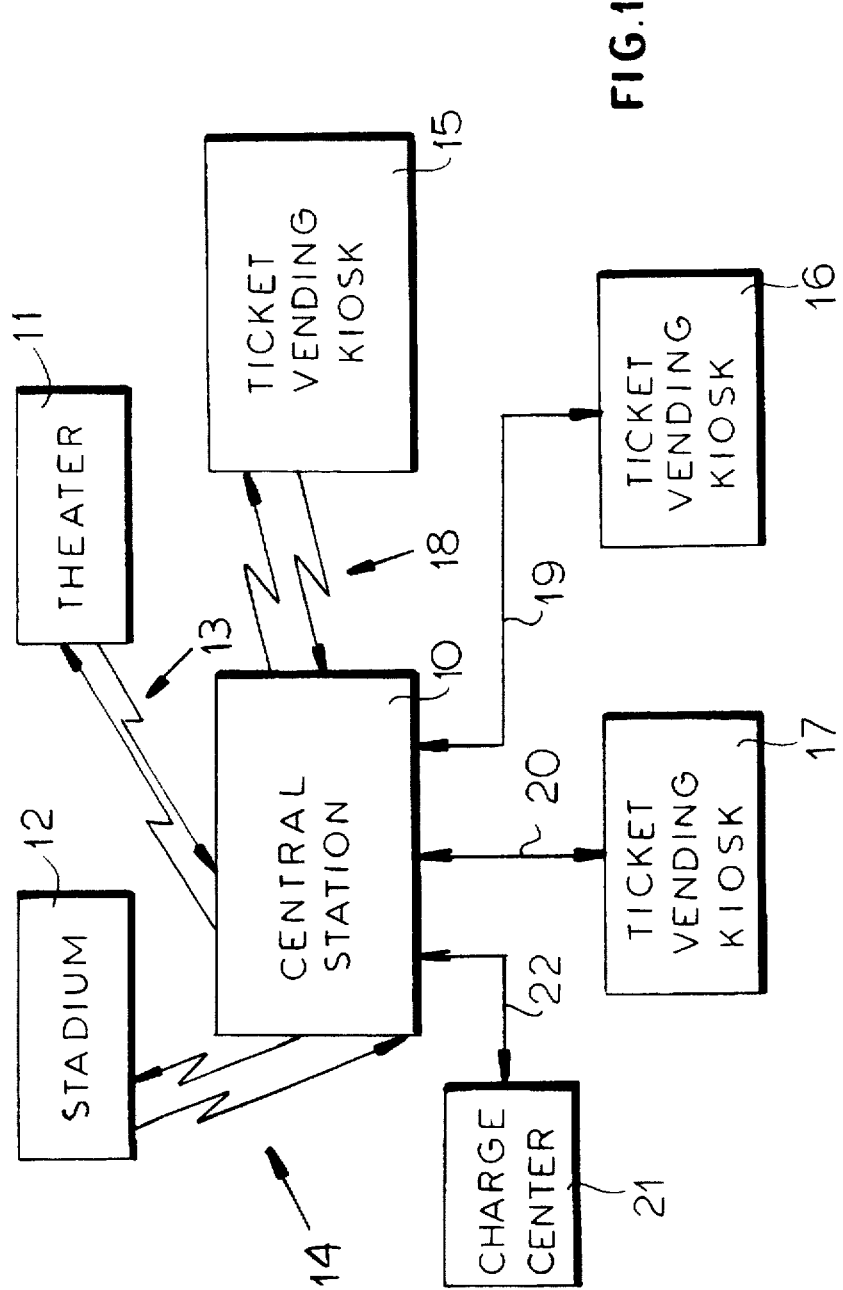
FIG. 1 is a block diagram of the system of the invention.

As can be seen from FIG. 1, the basic elements in the concierge system of the invention comprise a central station 10 which can communicate, preferably by CDPD wireless means although possibly also by telephone lines or wired communication means with a plurality of theaters or other event-generating facilities such as a sport's stadium as represented at 11 and 12, respectively. The communication paths between the central station and the theater 11 or the stadium 12 are bidirectional and represented at 13 and 13, respectively.

The central station 10 also communicates (via CDPD) with one or more ticket sales kiosks represented at 15, 16 and 17, as shown at 18, or via telephone or optical links as shown at 19 and 20, respectively.

The function of the central station as has been described, is to update media files and databases at the ticket sales kiosks 15, 16 and 17 as to current and future events, i.e. the particular programs or plays which are to be shown and the dates and times of the showings, and details as to the events, and current seating availability. The individual kiosks have various media storage capacity sufficient to accommodate graphic displays of scenes from the various events if desired or such scenes can be stored at the central station and called up by each individual kiosk as noted.

Furthermore, the central station is in communication with the theaters, the stadium or other performance locations so as to be continuously up-dated as to available seating and may provide the views from the particular seats selected at the kiosks or may program the individual kiosks with respect to such views. The central station is also in communication with a charge center as represented at 21 via the communication link 22 to obtain clearance for a credit card charge and any authorization which might be required to accept a credit card introduced into one of the ticket-vending kiosks.

Figure 2:
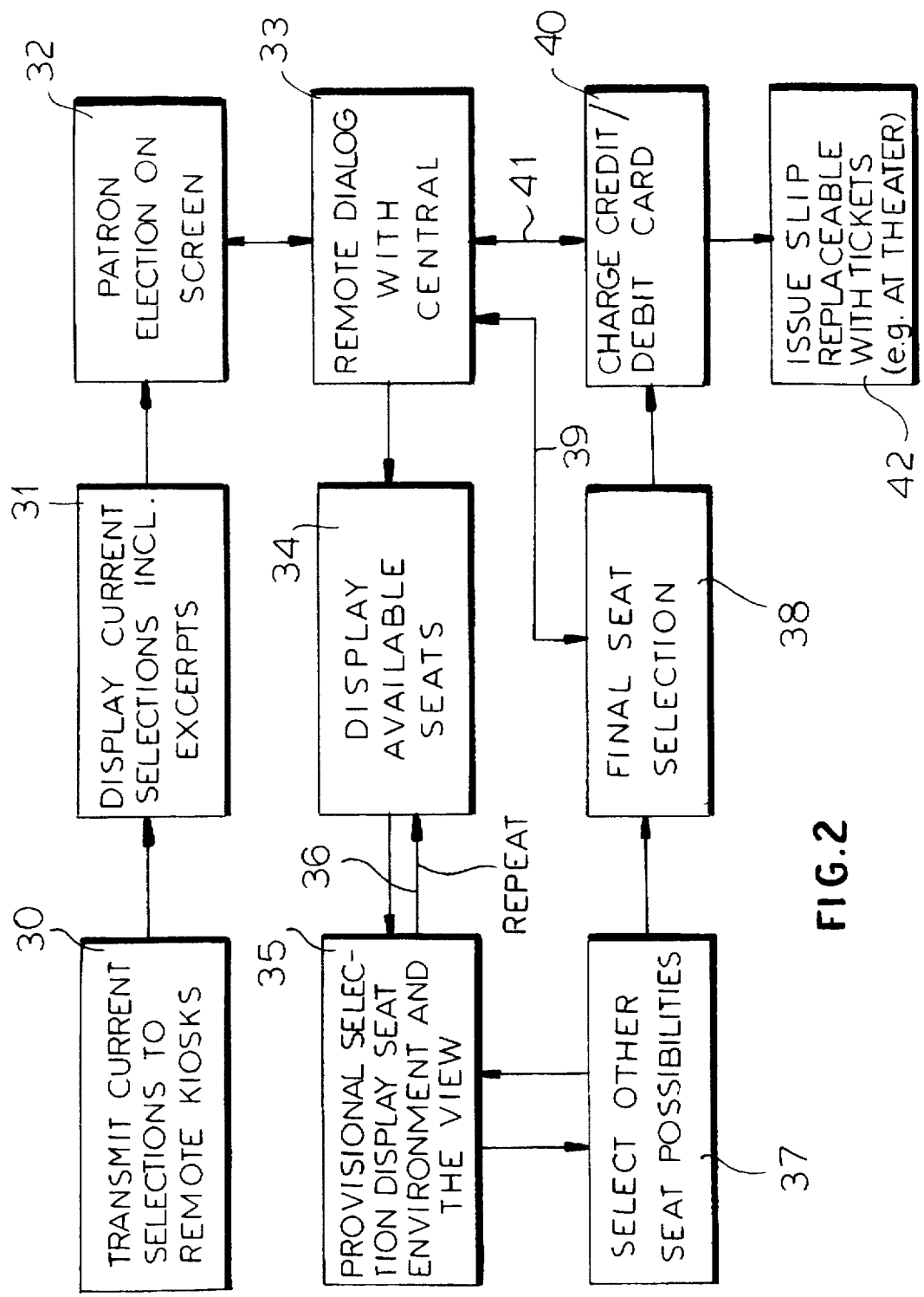
FIG. 2 is a block diagram illustrating steps in the process.

As can be seen from FIG. 2, in operation, the central station can be provided, as represented at 30, to transmit current selections to the remote kiosks which at 31 can display current selections as to potential events, including excerpts or scenes at the individual kiosks, under patron control or automatically as a promotional display.

The patron can then provide on-screen selection at 32 of a particular event or theater, thereby initiating dialogue with the central station as represented at 33 for display at the kiosk of available seats 34, coupled with provisional selection of a seat and display of the seat environment and the view from that seat as indicated at 35. This process may be repeated as represented at 36 with selection of alternative seating possibilities 37 until the patron makes a final seat selection at 38. This seat selection is communicated to the central station at 39 and a charge is made to a credit or debit card at 40 which has been inserted into the kiosk. When the charge is verified through the central station as represented at 41, a slip 42 which is redeemable for tickets at the box office, or tickets themselves are produced as information carriers.

Figure 3:
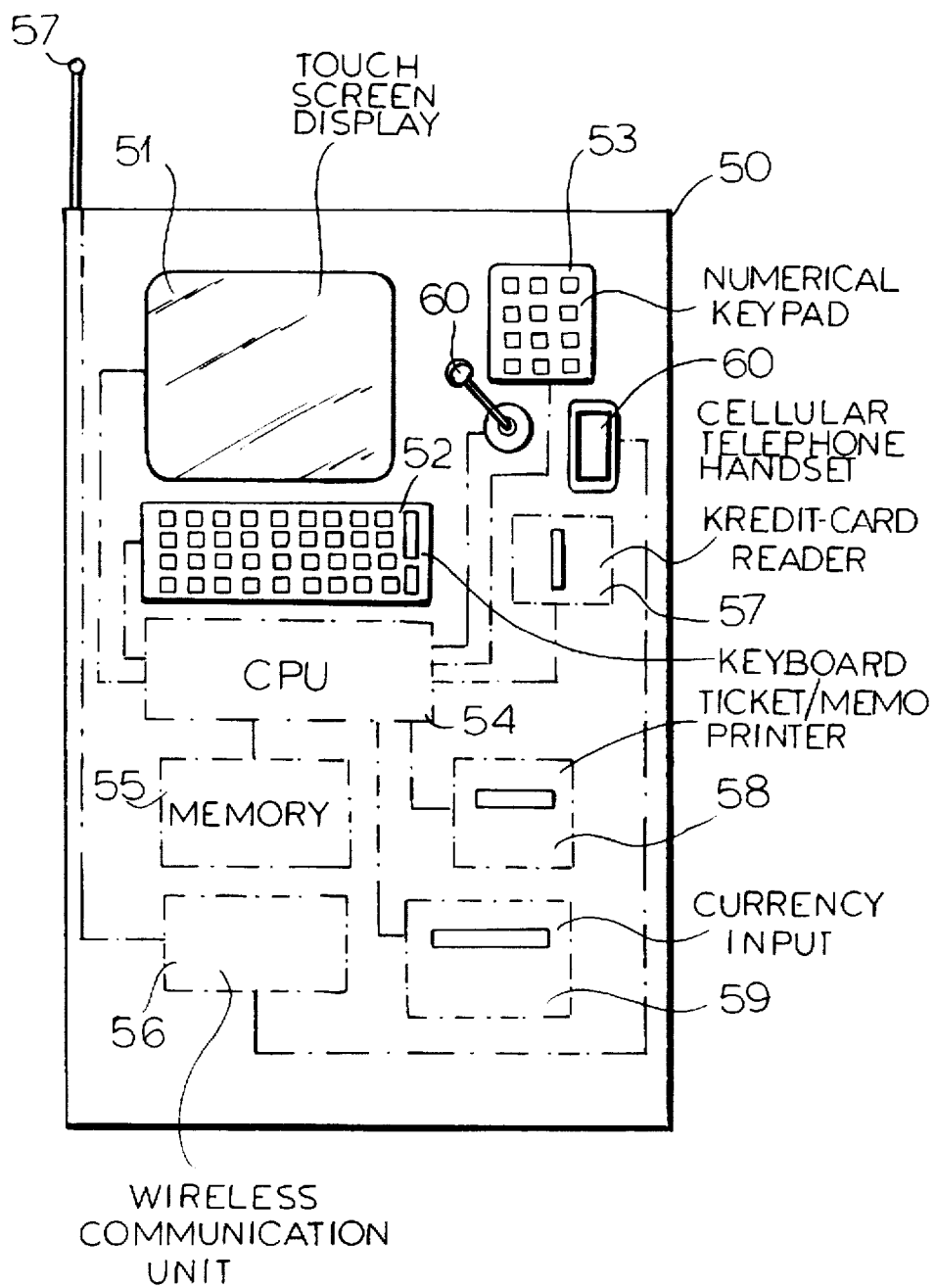
FIG. 3 is an elevational view of one of the kiosks of the system of FIG. 1.

From FIG. 3 it will be apparent that each of the kiosks can comprise a housing 50 with a video-type or CCD screen 51 forming the display. Preferably a touch-screen display is used so that the screen functions for selection of the various goods of the kiosk, for selection of the events, for seat selection and for signalling the apparatus that seat selection has concluded and the patron is awaiting charging and verification. The kiosk can, if desired, be provided with a keyboard 52 and a numerical key-pad 53 to assist in selection and/or inputting data such as a theater name, a particular date and time for which the patron has expressed interest as to future events, etc. The display 51, the keyboard 52 and the key pad 53 are all connected to the computer or central processing unit 54 in the kiosk housing.

The kiosk can also have a joystick 60 connected to the computer 54 and serving to enable the patron to engage in a virtual tour of any selected facility, its environs, and the interior of the facility as displayed upon the screen 51 accompanied by any audio which may be desirable or of interest.

The computer has a memory 55 and is linked by a wireless communication unit 56 with the antenna 57 or to a modem for telephone line communication with the central station, not here shown. Essential to the kiosk shown in FIG. 3 is a credit-card reader 57 into which the patron can insert a credit card and which can read that credit card and notify the central station through the kiosk computer of the credit card information for verification and charging. Also essential is a ticket or information carrier printer 58 also connected to the computer 54 and capable of printing the tickets themselves or, if desired, a coupon or slip entitled the patron to redeem that coupon for the requisite number of tickets at the box office. Of course, the information on the information carrier can include a receipt for the funds charged, the identification of the theater and its location, information as to the event, time and place, and even the seat numbers and locations if desired. Indeed, the seating information to be printed out can include a map or seating plan showing the patron the selected seat.

Optional is a currency input unit 59 which can receive currency, verify the validity thereof and store the currency for collection at a later date. The currency unit 59 is likewise connected to the computer 50.

The computer 54 or the central station computer can be programmed with a system for automatically displaying selected views of the facility from selected seating areas or individual seats.

The button system (FIG. 4), whether onscreen or via separate control and function buttons include the following, the button name being underscored:

Show/Event/Game/Performance Listing

Accesses and displays listing of all covered shows/events and brings up function buttons below. Any desired show/event can be highlighted by touching its screen position. When a show event is highlighted, the buttons below may be activated by subsequent touch.

Preview on demand

Accesses and displays a digital full-motion video and actual sound preview/vignette of highlighted show/event.

Dates and times

Accesses and displays date and time listings for highlighted show/event. Touching to highlight a specific date and time allows activation of the "seating availability" function immediately below.

Seating availability

Touching this button accesses the most recent update of seating availability data for highlighted show/event. Central station will use a sales time/volume algorithm to determine frequency of updates from central station to all remote locations that are in addition to updates received by individual units each time the "purchase tickets" function is activated. This approximate seating availability is displayed via a seating layout chart which shows prices and/or actual video of seating layout. Any desired seat can be highlighted by touching the screen. This allows activation of "seat view" button. On-screen message advises user that "purchase tickets" functions must be activated to see up-to-the-second seating availability.

Seat view

Opens a window showing the highlighted seat's view from the virtual tour program.

Show/event history

If applicable, this function accesses and displays an audio/video and/or text and photo history of the highlighted show/event. This might include information about the author, composer, choreographer, producer, director, stars, performers, teams, players, etc., depending on the show/event.

Show/event facility

Accesses and displays main view of highlighted show/event facility with address and any other key text information. When this function is activated, the related function buttons below are displayed and accessible.

Facility virtual tour

This accesses the virtual tour program which, through use of a joy-stick controller or on-screen directional control icons, allows user to visually walk into the highlighted theater, stadium or other facility and go on a self-guided tour with the help of appropriate over-view "maps".

Facility history

Accesses and displays an audio/video and/or text and photo history of the highlighted facility.

Theater/Stadium/Facility Listing

Accesses and displays listing of all covered show/event facilities and brings up function buttons below. Any desired facility can be highlighted by touching its screen position. When a facility is highlighted, the buttons below may be activated by subsequent touch.

Purchase Tickets

Credit card must be swiped or otherwise entered to activate this function. This is unavoidably required to allow sufficient time to check card acceptability and to access central station for continuous updating of seating availability while this function is operating. Final step of "purchase highlighted seats" will not be allowed until credit card is approved for an approximate appropriate amount. Actual amount will be approved prior to printing of coupon. If a credit card is denied, the purchase tickets function will immediately stop, a discrete message will be displayed and system will return to attract mode.

Touching and activating the purchase tickets function accesses and displays the show/event/game/performance listing.

Touching screen to highlight any desired show/event displays the dates and times listing for that specific show/event.

Touching screen to highlight a specific date and time accesses the current seating availability data and displays same via a seating layout chart which shows prices and/or actual video view of seating layout.

Touching to highlight a desired available seat allows either of the two buttons below to be touch activated. If all highlighted seats are not still available at moment of "purchase seats" touch, available seats are re-displayed and user is prompted to select alternates.

Purchase highlighted seats

If all highlighted seats are available, system immediately blocks out highlighted seats at central station and confirms to purchaser that seats have been reserved. Final credit card amount is checked for approval if more than initial approval amount. The ticket redemption coupon is then printed.

When the wireless communication unit 56 is a cellular telephone system, a handset 60 may be provided to allow voice communication with the central station.

Figure 4:
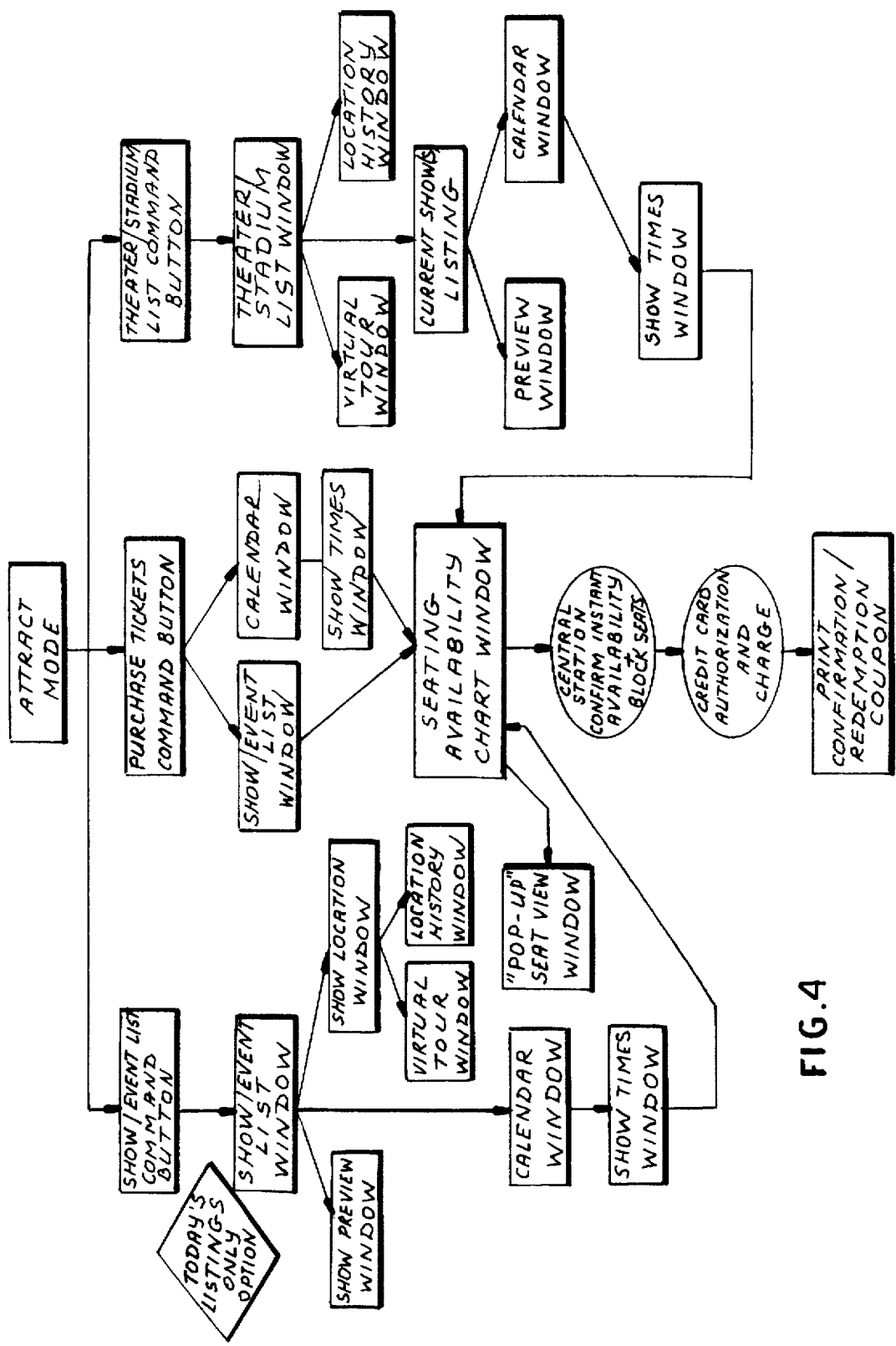
FIG. 4 is an algorithm diagram of the system of the invention.

Referring in greater detail to FIG. 4, it will be apparent that initially the kiosk will be in an ATTRACT MODE, notifying a potential patron to "TOUCH ANY BUTTON TO START." In the ATTRACT MODE the video display can provide samples of various available productions, performance sites and other information of interest to a passerby.

Upon selection of the theater/stadium list button, a THEATER/STADIUM LIST WINDOW is opened instructing the patron to "TOUCH ANY LISTING TO SELECT" and enabling the user to scroll through the listings of theaters, stadiums or other performance sites.

The patron can then select the VIRTUAL TOUR WINDOW to display the virtual tour described previously for that selected site, or the LOCATION HISTORY WINDOW for the detailed location history. At the visual tour the patron may be instructed "INSERT CREDIT CARD TO CONTINUE TOUR—NO CHARGE WILL BE MADE UNLESS TICKETS ARE PURCHASED". At the LOCATION HISTORY WINDOW the patron may be instructed "INSERT CREDIT CARD TO SEE MORE THEATER INFORMATION—NO CHARGE WILL BE MADE UNLESS TICKETS ARE PURCHASED." The current show listing can also be selected with the instruction "TOUCH SHOW LISTING TO SELECT." The current show listing will lead to the PREVIEW WINDOW enabling the patron to select a preview of the listed show with the instruction, after three previews, "INSERT CREDIT CARD TO SEE MORE PREVIEWS—NO CHARGE WILL BE MADE UNLESS TICKETS ARE PURCHASED."

Selection of the CALENDAR WINDOW (TOUCH DAY TO SELECT) will carry the patron to the SHOW TIMES WINDOW ("TO PURCHASE TICKETS INSERT CREDIT CARD AND TOUCH SHOW TIME DESIRED"), carrying the patron to the SEATING AVAILABILITY CHART WINDOW.

When the patron in the ATTRACT MODE selects the purchase tickets command button ("PLEASE INSERT CREDIT CARD"), selection can be effected of the CALENDAR WINDOW ("TOUCH ANY DAY TO SELECT") the show times window is displayed ("TOUCH TIME TO SELECT" to carry the user to the SEATING AVAILABILITY CHART WINDOW. Selection of the SHOW/EVENT LIST WINDOW ("TOUCH ANY LISTING TO SELECT") will also carry the user to the SEATING AVAILABILITY CHART WINDOW.

In the ATTRACT MODE, selection of the show/event list command button will display the SHOW/EVENT LIST WINDOW providing a SHOW PREVIEW WINDOW or a SHOW LOCATION WINDOW or a CALENDAR WINDOW. Selection of the latter "TOUCH ANY DAY TO SELECT" will provide the SHOW TIMES WINDOW and carry the patron to the SEATING AVAILABILITY CHART WINDOW. If desired, during the show/event selection, a window can be open providing the current day listing only option.

Touching the SHOW LOCATION WINDOW can provide the VIRTUAL TOUR and the LOCATION HISTORY WINDOWS as previously described.

The SEATING AVAILABILITY CHART WINDOW ("TOUCH SEATS TO SELECT AND TO SEE VIEW FROM SEATS") POPS UP THE SEAT VIEW WINDOW and effects communication with the central station, credit card authorization and indicia in the manner described.

We claim:

1. A method of correlating theater ticket sales, comprising the steps of:

(a) communicating to a multiplicity of vending kiosks information as to events and times for which seating is available at a plurality of performance locations;

(b) displaying information as to events at said vending kiosks;

(c) in response to selection of a particular event at one of said kiosks by a potential patron, displaying at least one scene exemplary of said particular event by accessing coded and digitalized live video;

(d) displaying at said one of said kiosks for said particular event at the respective performance location a respective seating plan indicating available seats;

(e) in response to selection of a potentially available seat at said one of said kiosks by said potential patron, displaying a view representing a view from the selected potentially available seat and accessed from coded and digitalized live video;

(f) charging a card presented by the patron for a selected seat;

(g) issuing to said patron at said one of said kiosks an information carrier representing a receipt for a charge made and a confirmed seat selection, authorizing admission of a bearer of said information carrier to said particular event; and (h) displaying from live video which has been coded and digitalized, views of an area and street vicinity of a selected performance location, views of a marquis, box office, lobby, lounge and historical and architectural points of interest of a selected performance location enabling a potential patron to virtually tour said selected performance location.

2. The method defined in claim 1 wherein information as to events and times for which seating is available at a plurality of performance locations is communicated to said kiosks from a central station in communication with said locations, and a display at said one of said kiosks for said particular event at the respective performance location of the respective seating plan indicating available seats is effected by dialog between said central station and said one of said kiosks.

3. The method defined in claim 2 wherein the charging of said card at said one of said kiosks is effected by dialog between said central station and said one of said kiosks.

4. The method defined in claim 3 wherein the display of a view representing a view from the selected potentially available seat is effected by dialog between said central station and said one of said kiosks.

5. The method defined in claim 4 wherein the issuing to said patron at said one of said kiosks of said information carrier representing a receipt for a charge made and a confirmed seat selection, authorizing admission of a bearer of said information carrier to said particular event is effected by dialog between said central station and said one of said kiosks.

6. The method defined in claim 1 wherein display of information at said one of said kiosks is effected by touch screen and selection is effected by said patron touching said touch screen.

7. The method defined in claim 1, further comprising the step of displaying at each of said kiosks in an attract mode views accessed from live video which has been coded and digitalized and showing excerpts from an actual performance at at least one of said locations.

8. The method defined in claim 1 further comprising the step of displaying a video replay of an actual event at a selected performance location as a preview in response to a selection by said potential patron.

9. The method defined in claim 1, further comprising the step of displaying a video containing information about an author, producer, director and star of a particular event upon selection by a potential patron.

10. The method defined in claim 1 further comprising the step of accessing and displaying a video history of a selected facility of one of said performance locations.

11. An apparatus for correlating theater ticket sales, comprising:

a central station accumulating information as to events occurring at a multiplicity of performance locations, available seating at said events and times of said events;

a plurality of vending kiosks remote from said central station;

means for communicating to a multiplicity of said vending kiosks information as to events and times for which seating is available at a plurality of performance locations;

means at each of said vending kiosks for displaying information as to said events;

means operable in response to selection of a particular event at one of said kiosks by a potential patron, for displaying at least one scene exemplary of said particular event;

means at said one of said kiosks for displaying for said particular event at the respective performance location a respective seating plan indicating available seats;

means in response to selection of a potentially available seat at said one of said kiosks by said potential patron, displaying a view representing a view from the selected potentially available seat;

means at said one of said kiosks for charging a card presented by the patron for a selected seat; and means at said one of said kiosks for issuing to said patron at said one of said kiosks an information carrier representing a receipt for a charge made and a confirmed seat selection, authorizing admission of a bearer of said information carrier to said particular event; and means at said one of said kiosks for displaying from live video which has been coded and digitalized, views of an area and street vicinity of a selected performance location, views of a marquis, box office, lobby, lounge and historical and architectural points of interest of a selected performance location enabling a potential patron to virtually tour said selected performance location and for virtually moving the patron through the tour.

12. The apparatus defined in claim 11 comprising a communications link between each vending kiosk and said central station for dialog therebetween.

13. The apparatus defined in claim 12 wherein said communications link is a wireless link.

14. The apparatus defined in claim 11 wherein said communications link utilizes modems in said kiosks and at said central station.

15. The apparatus defined in claim 11 wherein said means at said one of said kiosks for issuing to said patron at said one of said kiosks said information carrier representing a receipt for a charge made and a confirmed seat selection, authorizing admission of a bearer of said information carrier to said particular event is a printer.

16. The apparatus defined in claim 11 wherein said means at said one of said kiosks for charging a card presented by the patron for a selected seat includes a card reader in said one of said kiosks.

17. The apparatus defined in claim 11 wherein said means at each of said vending kiosks for displaying information as to said events includes a respective touch screen which can be touched by a patron to register a respective selection.

* * * * *